United States Patent [19]

Paros

[11] 4,382,385
[45] May 10, 1983

[54] DIGITAL DIFFERENTIAL PRESSURE TRANSDUCER

[75] Inventor: Jerome M. Paros, Redmond, Wash.
[73] Assignee: Paroscientific, Inc., Redmond, Wash.
[21] Appl. No.: 140,958
[22] Filed: Apr. 17, 1980
[51] Int. Cl.³ ............................................. G01L 11/00
[52] U.S. Cl. ........................................ 73/702; 73/720
[58] Field of Search ................. 73/704, 702, 717, 718, 73/719, 720, 721, 722, 716, 708, 706, 703

[56] References Cited

U.S. PATENT DOCUMENTS

| | | | |
|---|---|---|---|
| 2,477,233 | 7/1949 | Bristol | 73/716 |
| 2,866,339 | 12/1958 | Rhodes et al. | 73/716 |
| 2,956,252 | 10/1960 | Boode et al. | 73/719 |
| 3,369,404 | 2/1968 | Davison | 73/716 |
| 3,393,565 | 7/1968 | Klee | 73/704 |
| 3,485,104 | 12/1969 | Sanford | 73/722 |
| 3,664,237 | 5/1972 | Paros | 73/701 |
| 3,672,220 | 6/1972 | Agar | 73/704 |
| 4,091,682 | 5/1978 | Abbott et al. | 73/702 |

*Primary Examiner*—Donald O. Woodiel
*Attorney, Agent, or Firm*—Seed, Berry, Vernon & Baynham

[57] ABSTRACT

A digital differential pressure transducer with relatively low sensitivity to common mode line pressure errors. The transducer includes an airtight enclosure having a pair of pressure ports through which pressure is coupled to opposite sides of a pressure-sensing diaphragm or bellows. The force generated by the pressure differential across the diaphragm or bellows is coupled to a stress-sensitive resonator either directly or through a force-transmitting structure. A first bellows extends from the diaphragm or a bellows end cap. The first bellows has an effective area which is substantially smaller than the effective area of the pressure-sensing diaphragm or bellows so that it applies substantially less pressure-induced stress to the resonator than does the pressure-sensing diaphragm or bellows. A second bellows has an effective area and a mounting position chosen to counteract the effect of the first bellows on the pressure-sensing diaphragm or bellows. The common mode line pressure error of the transducer resulting from a mismatch between the forces generated by the first and second bellows is thus proportional to the ratio of the effective area of the first bellows to the effective area of the pressure-sensing diaphragm or bellows. This ratio can be minimized to minimize the common mode line pressure error. The first and second bellows encapsulate or surround either the resonator or a portion of the force-transmitting structure to isolate the resonator from the pressure ports, thereby optimizing the performance of the resonator.

16 Claims, 7 Drawing Figures

DIGITAL DIFFERENTIAL PRESSURE TRANSDUCER

BACKGROUND OF THE INVENTION

1. Field of the Invention

This invention relates to differential pressure transducers, and more particularly, to differential pressure sensors having a digital output and a low sensitivity to common mode line pressure errors.

2. Description of the Prior Art

A servo torque-balance pressure transducer with low sensitivity to common mode line pressure errors is described in U.S. Pat. No. 3,664,237 issued to Paros. This analog output sensor achieves low sensitivity to common mode line pressure errors through delicate adjustment of lever arm distances between the two bellows pressure inputs and a flexible pivot. The lever arm adjustment is designed to equalize the moments produced about the pivot axis when the same line pressure is applied to both bellows. Differential pressure between the bellows produces a resultant torque which may be measured using conventional servo techniques. The adjustment mechanism is complex, difficult to manufacture and requires inordinate skill to reduce the common mode line pressure errors to acceptable levels. One difficulty in this design is that since the full scale differential pressure range is determined by the effective areas of the bellows and the lever arm distances to the pivot, adjustments to the lever arm distances are directly proportional to full scale and, therefore, must be made with great precision. Common mode line pressure errors can nevertheless be reduced to an acceptable level with this device, since it produces an analog output which is inherently limited in accuracy. However, an analog output is less desirable than a direct digital-type signal because a digital signal is more compatible with digital computers and control systems as well as inherently more accurate. But it is this greater accuracy which makes common mode line pressure errors more apparent than they would be with a device producing a less accurate analog output. Thus, conventional differential pressure mechanisms are inherently incapable of providing optimum performance when used with a digital sensor since their common mode pressure error are an unacceptably high percentage of their differential pressure sensitivity.

In a paper delivered at the 27th Annual ISA Conference and Exhibit in October, 1972, and published in ISA Transactions, Vol. 12, 1973, pp. 173-1979, Paros describes the design of a "Precision Digital Pressure Transducer." This sensor employs two coaxial opposing bellows, with sealed ends attached to a pivotal suspension system. The bellows are mounted with the open ends adapted to receive pressure inputs such that differential pressure between the two bellows causes a resultant torque which stresses a vibrating quartz crystal whose frequency change is a measure of the differential pressure. No provision for reducing the common mode line pressure errors is described. These errors are caused by differences between the bellows effective areas or lever arm distances to the pivot and are directly proportional to full scale.

A number of load sensitive resonators are known. In an unstressed state, under constant environmental conditions, a vibrating element has a unique resonant frequency determined by its dimensions and material composition. This resonant frequency increases under tensile loading and decreases under compressive loading. The resonant frequency should be a true and accurate measure of the applied load. For optimum performance, stress-sensitive resonators should have a well-defined resonant frequency. Energy losses from the resonator reduce the "Q" or quality factor of the resonator thereby making the resonant frequency less well defined. One cause of energy loss from a resonator is friction between the resonator and the surrounding environment. The surrounding environment can also, with time, alter the performance of the resonator thus further degrading its performance. Consequently, it is desirable for resonators to operate in a vacuum or inert atmosphere.

Force sensitive crystal resonators are described in U.S. Pat. No. 2,984,111 issued to Kritz and U.S. Pat. No. 3,093,760 issued to Tarasevich in which loads are applied to crystals near the nodal points.

U.S. Pat. No. 3,470,400 issued to Weisbord describes a single beam force transducer with an integral mounting system which effectively decouples the beam vibrations from the mounting points through a spring and mass arrangement.

U.S. Pat. No. 3,238,789 issued to Erdley describes a load sensitive closed end tuning fork consisting of two tines or bars vibrating 180 degrees out of phase such that the reactive forces and moments cancel.

SUMMARY OF THE INVENTION

It is an object of this invention to provide a pressure transducer with an inherently digital-type output.

It is another object of this invention to provide a pressure sensor with high sensitivity, accuracy and stability.

It is still another object of this invention to provide a pressure transducer of small size and weight, with low power consumption.

It is yet another object of this invention to provide a differential pressure transducer with low sensitivity to common mode line pressure errors.

Differential pressure is applied across a single pressure sensing diaphragm or bellows, and the force induced by the differential pressure is coupled to a stress-sensitive resonator either directly or through a force transmitting structure. The resonator, or at least a portion of the force transmitting structure, is surrounded by a first bellows to isolate the resonator from the pressure sensing diaphragm or bellows. A second bellows is provided to counteract the pressure induced force applied to the resonator by the first bellows. The pressure induced forces generated by the first and second bellows are substantially smaller than the pressure induced forces generated by the pressure sensing diaphragm or bellows. The common mode line pressure error of the transducer resulting from a mismatch between the pressure induced forces generated by the first and second bellows and expressed as a percentage of the full scale differential pressure range is relatively low because the error is proportional to the ratio of the force mismatch to the force generated by the pressure sensing diaphragm or bellows.

In one embodiment the first bellows is concentrically mounted within a substantially larger pressure sensing bellows, and the second bellows is concentrically mounted on the opposite side of an end cap for the pressure sensing bellows. The stress-sensitive resonator is encapsulated by the first bellows so that the first bellows isolates the resonator from pressure inputs while the second bellows compensates for the presence of the first bellows. The common mode line pressure error is thus proportional to the ratio of the difference in effective area between the first and second bellows to the effective area of the pressure sensing bellows. This ratio can be made as small as desired to reduce the common mode error to an acceptable value.

In another embodiment, the pressure induced forces generated by a pressure sensing bellows are transmitted to a resonator through an end cap to a pivotally mounted lever arm. A first, relatively small bellows is concentrically surrounded by the pressure sensing bellows while a second bellows positioned on the opposite side of the pivot encapsulates the stress-sensitive resonator. The first and second bellows have respective effective areas and lever arms which are designed to produce respective moments about the pivot which are equal and opposite to each other. Any mismatch in the moments produced by the first and second bellows causes a common mode pressure error which is proportional to the difference in the product of bellows area times lever arm divided by the product of the effective area of the pressure sensing bellows times the pressure sensing bellows lever arm distance.

In other embodiments, the force induced by the pressure differential across a diaphragm is coupled to the force sensitive resonator through a push-rod which extends through a concentrically mounted first bellows. A second bellows positioned either concentrically with the first bellows or at the opposite side of a pivotally mounted force transmitting lever counteracts the effect of the first bellows. The first and second bellows isolate the resonator from the pressure inputs, and the common mode line pressure error can be reduced to an acceptable level by reducing the effective area of the first bellows relative to the effective area of the pressure sensing diaphragm.

DETAILED DESCRIPTION OF THE INVENTION

The present invention is equally applicable to load sensitive resonators of various shapes and configurations; however, for simplicity and clarity, only the application to flexurally vibrating force sensitive beam and closed end tuning fork devices will be described in detail, it being understood that the same or similar principles apply in the general case.

Figure 1:
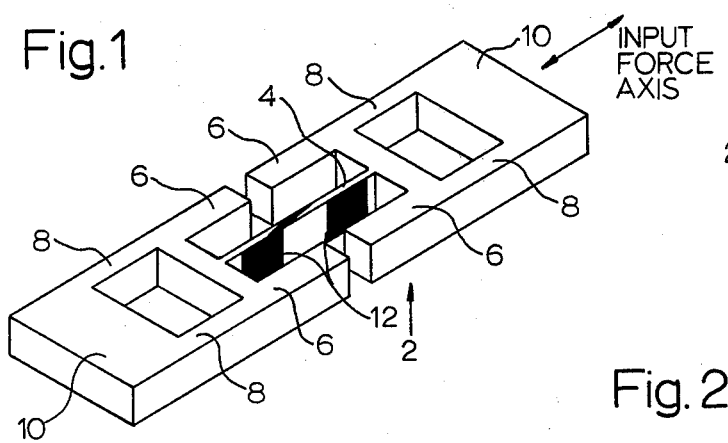
FIG. 1 is an isometric view illustrating a conventional single beam force transducer with integral mounting isolation.

FIG. 1 illustrates a conventional single beam force transducer 2 with integral mounting isolation as disclosed in the aforementioned patent to Weisbord. The transducer 2 consists of a flexurally vibrating center beam 4, two sets of isolator masses 6 and isolator springs 8 extending from each end of the beam 4 to mounting surfaces 10. Axial forces, applied along the longitudinal axis of the transducer 2 stress the vibrating beam 4, thereby changing its resonant frequency in accordance with the magnitude of the applied loads. The isolator masses 6 and isolator springs 8 are designed to decouple the reactive forces and moments generated by the beam 4 from the mounts 10, thus reducing the energy losses. As a result, the transducer 2 has a high "Q" so that its resonant frequency is an accurate representation of the applied forces. The "Q" can also be maximized by operating the transducer 2 in a vacuum. The beam 4 may be driven at its resonant frequency using electrodes 12 and oscillator circuitry in any conventional manner such as is described in U.S. Pat. No. 3,479,536 issued to Norris.

Figure 2:
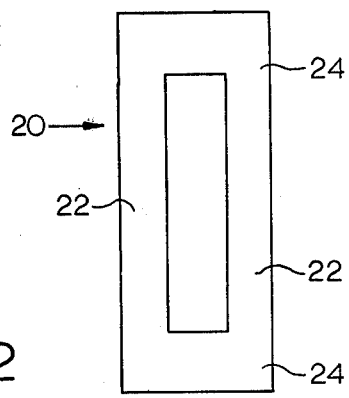
FIG. 2 is a plan view illustrating a conventional closed end tuning fork sensor.

FIG. 2 is a plan view of a conventional closed end tuning fork 20 as described in the aforementioned patent to Erdley. This device 20 achieves low energy loss, high "Q" operation by driving a pair of closely matched tines 22, 180 degrees out of phase, thus cancelling the reactive moments and forces which might be transmitted to a mount 24 from which the tines 22 project. As with the transducer 2 of FIG. 1, the "Q" of the tuning fork 20 can be maximized by operating it in a vacuum.

Under constant environmental conditions, the resonant frequency in Hertz, $f_o$, of an unstressed fixed-ended flexurally vibrating beam of length L, thickness t, width b, modulus of elasticity E and density d is given by the formula:

$$f_o = (\text{Constant}) \frac{t}{L^2} \sqrt{\frac{E}{d}} \quad \text{(Equation 1)}$$

Although the resonant frequency is generally a non-linear function of the applied load, F, the first order load sensitivity, $S_F$, may be calculated as:

$$S_F = (\text{Constant}) \frac{L^2 F}{E b t^3} \quad \text{(Equation 2)}$$

The quantitative relationships between resonant frequency, applied load, and resonator dimensions and composition can be determined from the above formulae. In particular, pressure induced loads may be generated by having the applied pressure, P, act on a bellows or diaphragm of effective area, A, and Equation 2 may be restated in terms of the first order pressure sensitivity, $S_p$, as:

$$S_p = (\text{Constant}) \frac{L^2 AP}{Ebt^3} \quad \text{(Equation 3)}$$

Although a number of load sensitive resonators may be mechanically stressed to form pressure sensors, the following discussions will illustrate the inventive devices using flexing bar resonators such as the single beam force transducer with integral mounting isolation and the closed end tuning fork force sensor.

Most resonators will perform more accurately, with less energy loss and with increased stability when operating in a vacuum or inert atmosphere. Therefore, a differential pressure transducer construction in which the line pressure is in contact with the resonator is undesirable. Yet, isolating structures such as bellows can themselves apply pressure induced forces to the resonator, and it is not easy to completely compensate for these isolating structures. For example, the pressure transducer described in the patent to Paros may be designed to isolate the sensing element from the line pressure through a pair of opposing bellows which act as both isolating elements and differential pressure inputs. In order to make these devices insensitive to common mode line pressure errors, the construction must include a mechanism which must be adjusted to account for differences in bellows effective areas and pivot lever arm distances. Since the full scale differential pressure range is determined by the bellows effective areas and lever arm distances, the aforementioned adjustments for line pressure errors must be carefully and skillfully made. It is generally impractical to mass produce differential pressure sensors with sufficient precision to maintain the common mode line pressure error at a level which does not degrade the accuracy of highly accurate digital stress sensors. Thus differential pressure sensing structures which are acceptable for use with an analog stress sensor can easily be unacceptable for use with a digital stress sensor.

Figure 3:
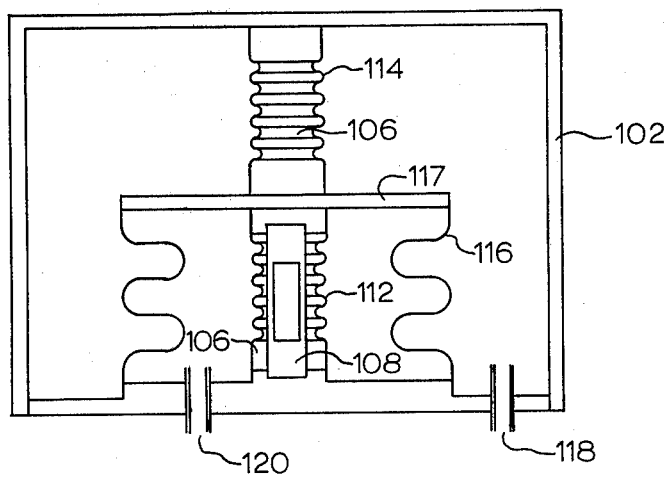
FIG. 3 is a sectional view of one embodiment of a digital differential pressure sensor having a relatively large pressure sensing bellows and a pair of substantially smaller, concentrically mounted, equal area bellows, one of which encapsulates a stress-sensitive resonator.

FIG. 3 illustrates an embodiment of a digital differential pressure transducer which isolates its stress-sensitive resonator from the pressure inputs and also has a low sensitivity to common mode line pressure errors. This configuration does not require any adjustment mechanism to reduce line pressure errors to acceptable levels. The sensor includes a relatively large bellows 116 having an end cap 117 mounted in an air-tight enclosure 102 having a pair of pressure ports 118, 120. The first pressure port 118 communicates with the interior of the housing 102 and hence with one side of the end cap 117. The second pressure port 120 communicates with the interior of the bellows 116 and hence with the other side of the end cap 117. The end cap 117 and bellows 116 thus act as a force generating member because a force is applied to the end cap 117 in a direction perpendicular to its planar surface which is proportional to the pressure differential between the interior and exterior of the bellows 116 and its effective area.

If the pressure sensor of FIG. 3 included only the bellows 116 and end cap 117, the common mode pressure sensitivity would be zero because the effective area on one side of the end cap 117 and bellows 116 is equal to the effective area on the other side of the end cap 117 and bellows 116. However, some structure must be used to transmit differential pressure induced forces from the end cap 117 to a stress sensitive resonator, and to isolate the resonator from the pressure ports 118, 120. This structure offsets the effective area of the bellows 116 and thus causes common mode pressure errors.

In the embodiment of FIG. 3, the end cap 117 is connected directly to a force sensitive closed end tuning fork resonator 108 which has its mounting pads attached to a first bellows 112. The bellows 112 reduces the effective area of the bellows 116. In order to compensate for the reduced effective area of the pressure sensing bellows 116, a second bellows 114 having an effective area matched to the effective area of the bellows 112 is positioned coaxially on the opposite side of the end cap 117.

The opposing ends of bellows 112 and 114 are sealed to enclosure 102. The other ends of bellows 112 and 113 are sealed and attached to the end cap 117 of the pressure sensing bellows 116. A vacuum or inert atmosphere 106 may be equally established in bellows 112 and 114 such that resonator 108 is isolated from the pressure ports 118, 120. The pressure sensing bellows 116 is sealed to enclosure 102; however, port 118 communicates pressure inputs to the outside of bellows 116 and port 120 communicates pressure inputs to the inside of bellows 116. The bellows 112 thus isolates the resonator 108 from external pressures while the bellows 114 compensates for the presence of the bellows 112.

When common mode line pressure is applied to ports 118 and 120, equal pressure is applied to bellows 112 and 114. If they have equal effective areas, then no resultant force is applied to resonator 108 resulting in no common mode line pressure errors. A differential pressure input acts on the effective area of the pressure sensing bellows 116 to stress the resonator and change its resonant frequency. The full scale differential pressure range is determined by the sizing of resonator 108 and pressure sensing bellows 116 in accordance with Equation 3. However, the common mode line pressure errors are only related to the difference in the effective area of bellows 112 and 114 as compared to the effective area of the pressure sensing bellows 116. In practice, it is not possible to fabricate the bellows 112 and 114 with exactly the same effective areas thereby causing some common mode line pressure errors. However, common mode line pressure errors, expressed as a fraction of full scale differential pressure range, can be minimized by using bellows 112 and 114 having an effective area which is substantially smaller than the effective area of bellows 116. As an example, suppose the effective area of bellows 116 were one hundred times larger than bellows 112 or 114. A 1% mismatch in areas between bellows 112 and 114 would only result in an error of 0.01% of full scale differential range when the common mode line pressure varies an amount equivalent to full scale.

Figure 4:
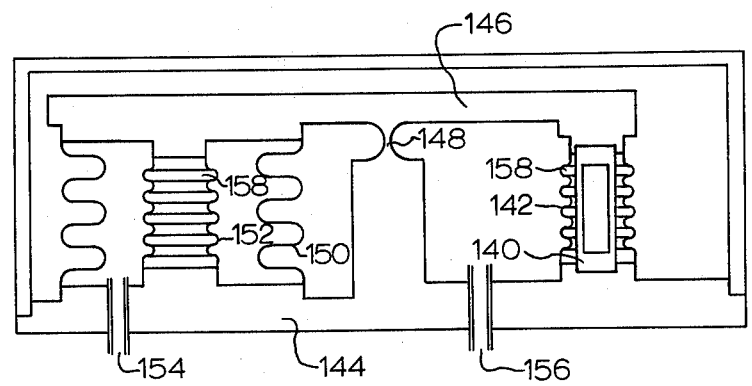
FIG. 4 is a sectional view of another embodiment of a digital differential pressure sensor in which forces produced by differential pressure across a large bellows are applied through a pivotal arrangement to a resonator encapsulated by a relatively small first bellows and in which the forces produced by the isolating bellows are offset by the forces produced by a second bellows.

As illustrated in FIG. 4, the isolating and pressure compensating bellows need not be coaxial and the pressure induced force need not be transmitted directly to the stress-sensitive resonator. Load sensitive resonator 140 is attached to and encapsulated by small sealed bellows 142 which is connected between base 144 and suspension arm 146. Arm 146 is pivotally mounted to base 144 through flexure hinge 148 which is compliant about an axis perpendicular to the plane of the figure, but relatively stiff in the cross-axes directions. Attached to base 144 and arm 146 on the opposite of pivot 148 from bellows 142 are large sealed pressure sensing bellows 150 and small sealed bellows 152. The effective areas of bellows 142 and 152 and their respective lever arm distances from pivot 148 are chosen such that when equal line pressure is applied through pressure ports 154 and 156, equal and opposite moments are produced about pivot 148 by the bellows 142, 152, thus leaving resonator 140 unstressed. However, when differential pressures are applied to ports 154 and 156, the differential pressure acts largely on the effective area of the large pressure sensing bellows 150 to produce a force and resultant torque about pivot 148 such that resonator 140 changes frequency and is thus a measure of the applied differential pressure. Resonator 140 preferably operates in a vacuum or inert atmosphere 158 contained within sealed bellows 142 or 152.

Figure 5:
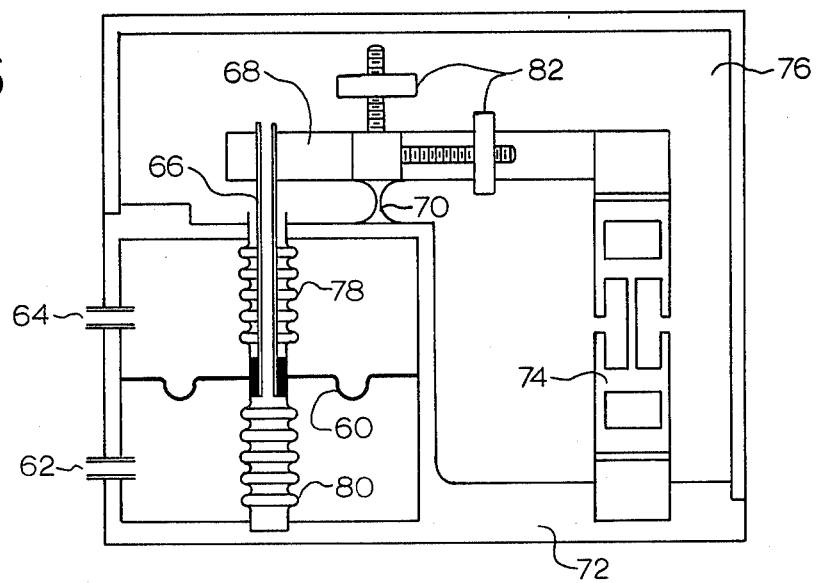
FIG. 5 is a sectional view of another embodiment of a digital differential pressure sensor having a push-rod and pivotal arrangement for transmitting forces induced by the pressure differential across a diaphragm to a resonator with the push-rod extending through a first bellows coaxially mounted with a second bellows positioned on the opposite side of the diaphragm.

FIG. 5 illustrates another embodiment of a digital differential pressure transducer with an isolated stress-sensitive resonator and low sensitivity to common mode line pressure errors. Differential pressure applied through ports 62 and 64 acts on the relatively large effective area of pressure sensing diaphragm 60 to generate a force transmitted through hollow tube 66 to suspension system arm 68. Suspension arm 68 is pivotally mounted to a fixed base 72 through flexure hinge 70. The pivot 70 is compliant about an axis perpendicular to the plane of the figure, but relatively stiff in the cross-axes directions. The torque about pivot 70 produced by the pressure induced force loads resonator 74 mounted between arm 68 and base 72. The consequent frequency change is a measure of the applied differential pressure. The resonator 74 may work in a vacuum or inert atmosphere 76 which communicates internally through small bellows 78 which is sealed between base 72 and diaphragm 60. The vacuum or inert atmosphere 76 also communicates through hollow tube 66 to the inside of small bellows 80 which is also sealed between diaphragm 60 and base 72. As with the embodiment of FIG. 3, common mode line pressure variations act to produce equal and opposite forces from small bellows 78 and 80, since the bellows 78, 80 are coaxial and they have substantially equal effective areas. As previously described, common mode line pressure errors caused by area differences between bellows 78 and 80 are effectively reduced by the ratio of bellows 78, 80 area to diaphragm 60 area. Counterbalance weights 82 may be positioned such that the effective center of gravity of the movable assembly lies at the pivot axis of flexure 70. When so balanced, external forces, vibration and acceleration have no lever arm over which to act, thus making the pressure transducer insensitive to those environmental errors.

Figure 6:
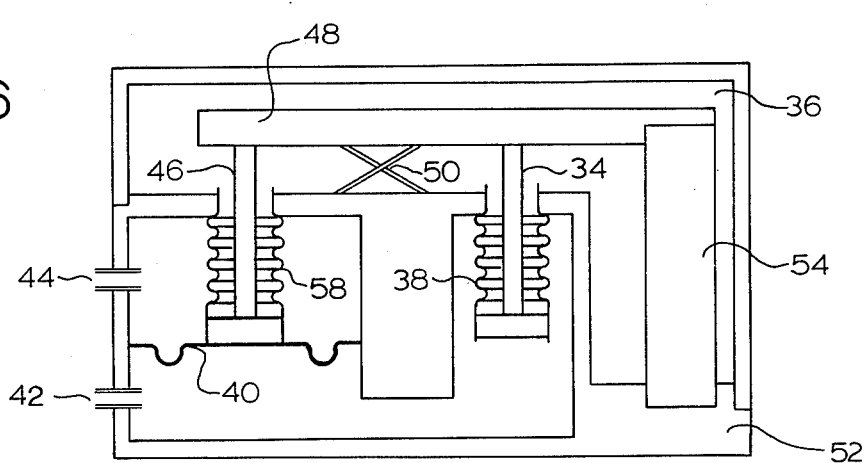
FIG. 6 is a sectional view of another embodiment of a digital differential pressure sensor wherein pressure induced forces are transmitted from a diaphragm to a resonator through a pivotally mounted lever arm and a push-rod extending through a first bellows, and the force produced by the first bellows is offset by a second bellows placed on the opposite side of the lever arm pivot.

FIG. 6 illustrates another embodiment of a digital differential pressure transducer with low sensitivity to common mode line pressure errors. Differential pressure applied through ports 42 and 44 act on the relatively large effective area of pressure sensing diaphragm 40 to generate a force transmitted through solid rod 46 to suspension system lever arm 48. Lever arm 48 is pivotally mounted to a fixed base 52 through flexure hinge 50. The pivot 50 is compliant about an axis perpendicular to the plane of the figure, but relatively stiff in the cross-axes directions. The pressure induced torque about pivot 50 stresses load sensitive resonator 54 mounted between arm 48 and base 52, thus changing its resonant frequency to indicate the applied differential pressure. The pressure media entering port 44 is isolated from the resonator 54 through a small bellows 58 which is sealed between base 52 and the diaphragm 40 and rod 46 assembly. A second small bellows 38 isolates the port 42 from the resonator 54 to allow the resonator 54 to operate in a vacuum or inert atmosphere 36. Bellows 38 is located on the opposite side of pivot 50 from bellows 58 and is sealed to rod 34 and base 52. Rod 34 is attached to suspension arm 48 such that line pressure applied to bellows 38 through port 42 produces a torque about pivot 50 counter to the torque produced by the line pressure entering port 44 which acts on bellows 58 and rod 46. The product of the effective area of bellows 58 and lever arm distance from rod 46 to pivot 50 is made equal to the product of the effective area of bellows 38 and the lever arm distance from rod 34 to pivot 50 such that equal and opposite moments imparted to suspension arm 48 are produced as the line pressure varies. As with the previous embodiments, errors caused by line pressure variations are small due to the matching of torques about pivot 50 produced by small bellows 38 and 58 and the comparatively large area of the diaphragm 40.

Figure 7:
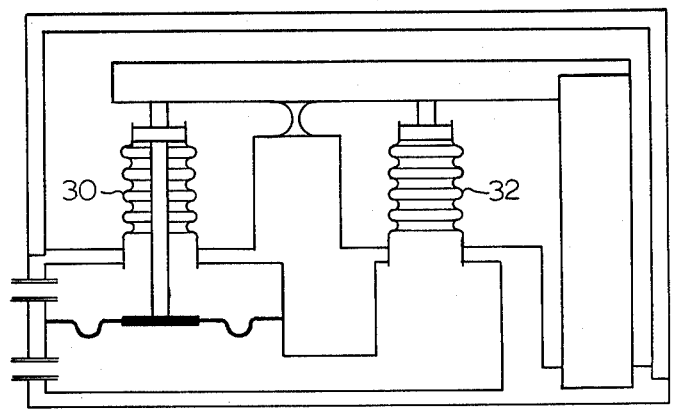
FIG. 7 is a sectional view of still another embodiment of a digital differential pressure transducer which is substantially identical to the embodiment of FIG. 6 except for the reversal of the relationship between the first and second bellows and their respective push rods.

FIG. 7 illustrates an embodiment similar to the construction shown in FIG. 6, except that isolating bellows 30 and line pressure compensating bellows 32 are internally pressurized with the applied pressure media.

The embodiments of the invention described herein are illustrative only, and variations which isolate the stress-sensitive resonator from the pressure inputs and also permit low common mode line pressure errors will be apparent. For example, the bellows 38 and rod 34 of FIG. 6 can be positioned on the same side of the flexure hinge 50 as the bellows 58 and rod 46 and in opposed relation thereto. Further, the bellows 38, 58 can have different effective areas as long as the lever arms from the rods 34, 46 to the flexure hinge 50 are adjusted so that the bellows 38, 58 apply equal and opposite moments to the suspension arm 48. An another example, it is apparent that it is unnecessary for one of the small bellows to be concentric with the larger pressure sensing diaphragm or bellows. Accordingly, the bellows 152 of FIG. 4 can be removed from inside the pressure sensing bellows 150 to a position either on the same side of the flexure hinge 148 as the bellows 150 or the other side of the flexure hinge in opposed relation to the bellows 142 as long as the effective areas and lever arm distances of bellows 142, 152 are adjusted so that the bellows 142, 152 impart equal and opposite moments to lever arm 146.

I claim:
1. A digital differential pressure sensor, comprising:
a stress-sensitive resonator;
an enclosure having first and second pressure ports;
a force-generating member isolating said first pressure port from said second pressure port, said force-generating member being mechanically coupled to said resonator and moving in a direction which applies a stress to said resonator responsive to forces induced by the pressure differential across said member; and;
first and second bellows mechanically coupled to said resonator and having respective areas and positions selected so that the forces imparted to said resonator by said first and second bellows responsive to a predetermined pressure applied to said first and second pressure ports are substantially equal and opposite to each other and substantially less than the force applied to said resonator by said force-generating member responsive to a differential pressure equivalent to said predetermined pressure applied to said first and second pressure ports, at least one of said first and second bellows being positioned to isolates said resonator from said first and second pressure ports, whereby the common mode line pressure error of said sensor as a ratio of full scale differential pressure range is proportional to the ratio of the difference in the forces generated by said first and second bellows to the force generated by said force generating member and said resonator is isolated from said first and second pressure ports.

2. The digital differential pressure sensor of claim 1, wherein said first and second bellows have substantially the same effective area, said area being substantially smaller than the effective area of said force-generating member, said first and second bellows being mounted on opposite sides of said force-generating member concentric to each other and to said force-generating member.

3. The digital differential pressure sensor of claim 2, wherein said stress-sensitive resonator has a pair of spaced-apart mounting pads and wherein said resonator is mounted within said first bellows with one of said mounting pads secured to said force-generating member while the other of said mounting pads is carried by said enclosure such that differential pressure-induced forces are transmitted from said force generating member directly to said stress-sensitive resonator.

4. The digital differential pressure sensor of claim 3 wherein said force-generating member is a pressure-sensing bellows having a bellows end cap, and wherein one of said first and second bellows is concentrically mounted within said force generating bellows.

5. The digital differential pressure sensor of claim 2, wherein said force-transmitting means includes a rod extending along the axis of said first bellows, said rod having one end secured to said force-generating member and the other end secured to a pivotally mounted lever arm, said resonator being secured to said lever arm such that pressure-induced forces imparted to said force generating member are transmitted to said resonator through said rod and lever arm.

6. The digital differential pressure sensor of claim 5, wherein said rod is hollow and its ends are open to said second bellows and to the interior of said enclosure to allow communication therebetween, and wherein the end of said first bellows opens into said enclosure, thereby equalizing the pressure between said first and second bellows.

7. The digital differential pressure sensor of claim 6, wherein said force-transmitting member is a circular diaphragm mounted in a cylindrical housing and wherein said first and second bellows extend concentrically along the axis of said housing with one end wall of each bellows secured to said housing and the other end wall of each bellows secured to opposite faces of said diaphragm.

8. The digital differential pressure sensor of claim 1, wherein said force-generating member includes a pressure sensing bellows concentrically surrounding said first bellows and extending between said housing and a pivotally mounted lever arm such that the pressure differential between the interior and exterior of said pressure sensing bellows applies a moment to said lever arm about said pivot, said first and second bellows having respective positions and effective areas to apply equal and opposite moments to said lever arm responsive to a common pressure applied to said first and second pressure ports, said resonator being connected between said lever arm and said housing such that pressure-induced forces are transmitted from said pressure sensing bellows to said resonator through said lever arm.

9. The digital differential pressure sensor of claim 8, wherein said first and second bellows are of equal area and positioned on opposite sides of said pivot of equal distances therefrom.

10. The digital differential pressure sensor of claim 9, wherein said resonator is encapsulated by one of said first and second bellows.

11. The digital differential pressure sensor of claim 1, further including a pivotally mounted lever arm and a rod extending concentrically along the axis of said first bellows and having one end secured to said force-generating member and the other end secured to said lever arm, and wherein said resonator extends between said lever arm and said enclosure such that pressure-induced forces are transmitted from said force-generating member to said resonator through said rod and lever arm, said sensor further including a second rod extending concentrically along the axis of said second bellows with one end connected to said lever arm and the other end connected to an end cap covering the end of said bellows, said first and second bellows having effective areas and positions selected so that said first and second bellows transmit equal and opposite moments to said lever arm through their respective rods responsive to a common pressure applied to said first and second pressure ports.

12. A digital differential pressure sensor, comprising:
an airtight enclosure having first and second pressure ports;
a pressure sensing bellows mounted within said enclosure, said bellows extending from a portion of said housing to a bellows end cap, the interior of said bellows communicating with said first pressure port and the exterior of said bellows communicating with said second pressure port;
a first bellows having an effective area substantially smaller than the effective area of said pressure sensing bellows, said first bellows extending along the axis of said pressure sensing bellows and having one end secured to one face of said end cap and the other end secured to a portion of said housing;
a second bellows having an effective area substantially equal to the effective area of said first bellows, said second bellows being concentrically encapsulated by said pressure sensing bellows with one end secured to the opposite face of said bellows end cap and the other end secured to a portion of said housing; and
a stress-sensitive resonator mounted within one of the said first and second bellows and having respective ends secured to said bellows end cap and said housing such that the pressure differential at said first and said second pressure ports imparts a force to said bellows end cap which is measured by said stress-sensitive resonator while one of said first and second bellows isolates said resonator from said first and second pressure ports and the other of said first and second bellows compensates therefor.

13. A digital differential pressure sensor, comprising;

an airtight enclosure having first and second pressure ports;

a pivotally mounted lever arm;

a pressure sensing bellows extending between said lever arm and a portion of said housing, the interior of said pressure sensing bellows communicating with said first pressure port while the exterior of said pressure sensing bellows communicates with said second pressure port, said bellows being adapted to generate a moment about said pivot responsive to a differential in pressure between said first and second pressure ports;

a first bellows having an effective area substantially smaller than the effective area of said pressure sensing bellows, said first bellows being concentrically surrounded by said pressure sensing bellows and having its respective ends connected between said lever arm and a portion of said housing;

a second bellows having an effective area and position selected to generate a moment equal and opposite to the moment generated by said first bellows responsive to a common pressure applied to first and second pressure ports; and a stress-sensitive resonator mounted within one of said first and second bellows and having respective ends secured to said lever arm and a portion of said housing such that a force is transmitted to said resonator from said pressure sensing bellows responsive to a pressure differential between said first and second pressure ports while one of said first and second bellows isolates said resonator from said first and second pressure ports and the other of said first and second bellows compensates therefor.

14. A digital differential pressure sensor, comprising:

an airtight enclosure having first and second pressure ports;

a force-generating member having a generally planar surface isolating said first pressure port from said second pressure port, said force-generating member moving in a direction perpendicular to said planar surface responsive to forces induced by the pressure differential across said force-generating member;

a first bellows having an effective area substantially smaller than the effective area of said force-generating member, said bellows being concentrically mounted with said force-generating member and having respective ends connected to said force-generating member and a portion of said housing;

a second bellows having an area substantially equal to the area of said first bellows, said second bellows extending concentrically along the axis of said first bellows and having respective ends secured to the opposite face of said force-generating member and to a portion of said housing;

a pivotally mounted lever arm;

a rod extending through one of said bellows, said rod having one end secured to said force-generating member and the other end secured to said lever arm; and a stress-sensitive resonator having respective ends secured to said lever arm and a portion of said housing such that forces induced by pressure differentials between said first and second pressure ports are transmitted from said force-generating member to said resonator through said rod and said lever arm while said first and second bellows isolate said resonator from said pressure ports.

15. The digital differential pressure sensor of claim 14 wherein said force-generating member is a circular diaphragm mounted in an airtight cylindrical housing to divide said housing into two section, each of which communicates with one of said pressure ports, and wherein said rod is hollow and has one end opening into one of said bellows and the other end opening into said enclosure while the other of said bellows opens into said enclosure, thereby equalizing the pressure between said first and second bellows and isolating said resonator from the first and second pressure ports.

16. A digital differential pressure sensor, comprising:

an airtight enclosure having first and second pressure ports;

a pivotally mounted lever arm;

a force-generating member having a planar surface isolating said first pressure port from said second pressure port, said force-generating member moving in a direction perpendicular to said planar surface responsive to forces induced by the pressure differential across said member;

said planar surface dividing an airtight housing into two sections, each of which communicates with one of said pressure ports;

a first bellows concentrically mounted with said force-generating member to isolate the first section of said housing from the interior of said enclosure, said first bellows having respective ends connected to said force-generating member and a portion of said housing;

a first rod extending through said first bellows, said rod having respective ends connected to said force-generating member and to said lever arm;

a second bellows isolating the second section of said housing from the interior of said enclosure;

a second rod extending through said second bellows and having respective ends connected to a bellows end cap and said lever arm, the position and effective area of said second bellows with respect to said first bellows being selected so that the moments imparted to said lever arm by said first and second bellows are equal and opposite to each other responsive to pressure applied to said first and second pressure ports, and;

a stress-sensitive resonator having respective ends connected to said lever arm and a portion of said housing such that differential pressure induced forces are transmitted from said force generating member to said resonator by said first push rod and said lever arm, while said first and second bellows isolate said pressure ports from said resonator.

* * * * *